United States Patent [19]

Lapinoja

[11] Patent Number: 4,519,583
[45] Date of Patent: May 28, 1985

[54] RETAINER FOR A REPLACEABLE VALVE SEAT

[75] Inventor: Lonnie L. Lapinoja, Sauk Rapids, Minn.

[73] Assignee: General Signal Corporation, Stamford, Conn.

[21] Appl. No.: 539,651

[22] Filed: Oct. 6, 1983

[51] Int. Cl.³ .......................... F16K 3/02; F16K 3/30
[52] U.S. Cl. ..................................... 251/328; 251/360
[58] Field of Search .............. 251/360, DIG. 1, 328, 251/359, 326, 327, 329; 277/170, 184, 189

[56] References Cited
U.S. PATENT DOCUMENTS 2,925,994  2/1960  Downs et al. ...................... 251/360
3,827,673  8/1974  Houlgrave et al. ................. 251/360

Primary Examiner—Martin P. Schwadron
Assistant Examiner—John S. Starsiak, Jr.
Attorney, Agent, or Firm—Barnes & Thornburg

[57] ABSTRACT

A retention system for a valve seat ring wherein the inner wall of an annular recess is sufficiently thin so as to be deformed at portions thereof to engage at least portions of the inner surface of the valve seat ring and to thereby retain the valve seat ring in the annular recess. The inner wall of the valve seat ring forms an acute angle with the base such that the deformed top portion of the inner wall of the annular recess extends radially beyond the inner edge of the base of the valve seat ring.

15 Claims, 1 Drawing Figure

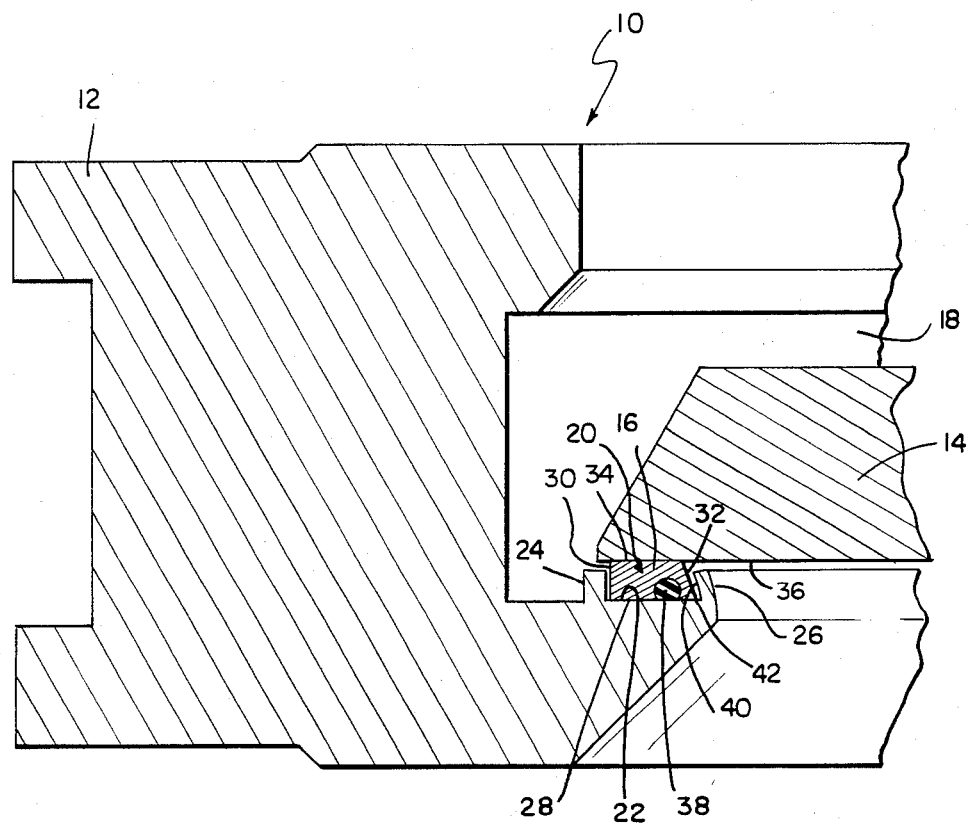

4,519,583

RETAINER FOR A REPLACEABLE VALVE SEAT

BACKGROUND AND SUMMARY OF THE INVENTION

The present invention relates generally to valves and more specifically to an improved valve seat retention structure.

The valve generally includes a housing, a movable valve element and a valve seat. The valve seat is secured to the housing by various means depending upon the size of the valve and the type of valve. Butterfly valves, since they do not engage the valve seat except in the closed position, are easier to design retention structures than for other types of valves, for example, ball and gate valves, wherein the valve element continuously engages portions of the valve seat in movement between its open and closed positions. With gate valves having metal valve seats, these seats are generally an integral part of the housing. In other environments where rubber or elastomeric material may be used to form the valve seat, the top of the valve seat is held within an annular recess at its top by the gate itself and a lug or other retaining element is welded at the bottom of the seat. In smaller sized valves, for example, the 30 inch valve, this type of retention system has proven satisfactory whereas in the larger valves such as 72 inches, the number of welded retainers that must be included makes replacement of the valve element difficult. Also, the elastomeric material may be bonded to the annular recess and this bonding also makes replacement difficult.

Thus, there exists the need for a valve retention system which makes valve seat replacement relatively easy.

An object of the present invention is to provide a valve seat retention system which makes valve replacement quick and efficient.

Another object of the present invention is to provide a valve seat retention system for use in large valves.

A further object of the present invention is to provide an improved valve retention system for gate valves.

These and other objects of the invention are attained by forming the inner wall of an annular recess for the valve seat sufficiently thin to be deformed at portions thereof to engage at least portions of a lateral surface of the valve seat to thereby retain the valve seat in the annular recess. The annular wall of the valve seat which is engaged by the deformed portions of the inner wall of the recess forms an acute angle with the base surface of the valve seat. Thus, the top edge of the deformed portion of the inner wall extends into the recess radially beyond the adjacent lateral edge of the base surface of the valve seat to produce the retention. The valve seat is easily replaced by unbending the deformed portions and removing the annular valve seat. The retention system is designed specifically for gate valves, but may also be used for other types of valves.

BRIEF DESCRIPTION OF THE DRAWINGS

The FIGURE is a cross-sectional view of a gate valve incorporating the retainer system according to the principles of the present invention.

DETAILED DESCRIPTION OF THE DRAWINGS

A valve 10 is shown in the FIGURE as including a valve housing 12, a valve element 14 and a valve seat 16.

The valve housing includes a fluid passage 18 and an annular recess 20 about the fluid passage 18. The annular recess 20 includes a base wall 22, an outer wall 24 and an inner wall 26. The valve seat ring 16 includes a base surface 28, a first lateral exterior surface 30, an interior lateral surface 32 and a seating surface 34 which engages the surface 36 of valve element 14. The valve seat ring 16 includes embedded therein a reinforcing ring 38 which may be, for example, metal. While the outside lateral surface 30 of the valve seat 16 extends generally perpendicular to the base surface 28, the inner lateral surface 32 forms an acute angle with the base surface 28.

The retention system of the present invention includes designing the interior wall 26 of the annular recess 20 to be sufficiently thin so as to be deformed easily by a tool. By deforming the inner wall 26, its upper edge intersects the inside lateral surface 32 of the valve seat 16 and thereby retains the valve seat ring within the annular recess. No other retention element is needed. The top edge 40 of the inner wall 26 extends radially beyond the interior edge 42 of the base surface to accomplish the retention.

The inner wall 26 of the annular recess 20 may be deformed at spaced apart portions of the total circumference of the annular recess and not along its total circumference. Thus, it can be seen that the valve seat 16 can be readily replaced by merely bending the deformed portions of the inner wall 26 back radially to a distance less than the edge 38 of the base of the retention ring so that the valve seat ring may be removed. The new ring is inserted and the inner wall 26 is again deformed. Thus, the valve seat ring need not be bonded within the annular recess, thus reducing the amount of time and effort required to remove the valve seat ring.

By way of illustration, in a 42 inch valve, the inner wall 26 of the recess would have a height of ¼ inch and a thickness of 3/16 inch whereas the outer wall 24 would have a height of ¼ inch and a thickness of ⅜ inch. The valve seat ring 16 being elastomeric material would have a base surface 28 of the length ⅝ inch, an outer lateral surface 30 of length ⅜ inch, the inner slanted lateral surface 32 of the length 7/16 inch and a valve contact surface 34 of the length ¾ inch. For the 42 inch valve of this dimension, it has been tested and found that the valve seat ring is retained up to differential pressures of 150 psi.

Although the present invention has been designed specifically for gate valves using elastomeric valve seat rings, it is applicable to other type valves as well as other valve rings. For example, the valve seat ring 16 may be metal or other non-elastomeric materials. Also, the retention system may be used in ball valves.

From the preceding description of the preferred embodiment, it is evident that the objects of the invention are attained, and although the invention has been described and illustrated in detail, it is to be clearly understood that the same is by way of illustration and example only and is not to be taken by way of limitation. The spirit and scope of this invention are to be limited only by the terms of the appended claims.

What is claimed is:

1. In a valve structure having a body, a flow passage through said body, a valve element movable in said body to control the flow through said flow passage, an annular recess about said flow passage and a valve seat secured in said annular recess engaging said valve element in the closed position of said valve element, the improvement comprising:

said annular recess having an opposed inner and outer annular wall extending traverse to a base wall;

said valve seat having at least a first and second lateral surface, a base surface and a seat surface; and being insertable into said recess without deformation of said valve seat said first and base surfaces of said valve seat engaging respectively said outer and base walls of said annular recess; and said inner wall of said recess being sufficiently thin to be deformed at portions thereof to engage at least portions of said second surface without deformation of said second surface and to thereby retain said valve seat in said annular recess.

2. A valve structure according to claim 1 wherein said second surface of said valve seat forms an acute angle with said base surface of said valve seat.

3. A valve structure according to claim 1 wherein said deformed portion of said inner wall forms an acute angle with said base wall of said recess.

4. A valve structure according to claim 2 wherein the top edge of said deformed portions of said inner wall extends into said recess radially beyond the adjacent lateral edge of said base surface of said valve seat.

5. A valve structure according to claim 2 wherein said valve seat is an elastomeric material retained only by said deformed portions of said inner wall.

6. A valve structure according to claim 1 wherein the top edge of said deformed portions of said inner wall extends into said recess radially beyond the adjacent lateral edge of said base surface of said valve seat.

7. A valve structure according to claim 1 wherein said valve seat is an elastomeric material retained only by said deformed portions of said inner wall.

8. A valve structure according to claim 1 wherein said valve element engages said valve seat in a closed position and when it is moved from said closed to an open position within said body.

9. A valve structure according to claim 1 wherein said valve structure is a gate valve.

10. The valve structure according to claim 1 wherein said valve seat is a rigid, metallic material retained only by said deformed portions of said inner wall.

11. The valve structure according to claim 10 wherein said valve seat includes embedded therein at least one ring element forming a portion of said base surface of said valve seat.

12. The valve structure according to claim 11 wherein said ring element is formed from an elastomeric material.

13. The valve structure according to claim 1 wherein said valve seat is formed to have a trapazoidal cross-section whose base engages said base wall of said annular recess.

14. The valve structure according to claim 1 wherein said valve seat includes embedded therein at least one ring element forming a portion of said base surface of said valve seat.

15. The valve structure according to claim 14 wherein said ring element is formed from a metallic material.

* * * * *